United States Patent
Buxbaum

(10) Patent No.: US 7,323,034 B2
(45) Date of Patent: Jan. 29, 2008

(54) SPACE GROUP CP2 ALLOYS FOR THE USE AND SEPARATION OF HYDROGEN

(76) Inventor: Robert E. Buxbaum, 25451 Gardner, Oak Park, MI (US) 48237

( * ) Notice: Subject to any disclaimer, the term of this patent is extended or adjusted under 35 U.S.C. 154(b) by 437 days.

(21) Appl. No.: 11/001,391

(22) Filed: Dec. 1, 2004

(65) Prior Publication Data

US 2006/0174766 A1    Aug. 10, 2006

Related U.S. Application Data

(60) Provisional application No. 60/526,056, filed on Dec. 1, 2003.

(51) Int. Cl.
  *B01D 53/22* (2006.01)
(52) U.S. Cl. ........................ 95/56; 95/55; 95/116; 96/4; 96/10; 96/11; 96/108; 55/524; 55/DIG. 5
(58) Field of Classification Search ............... 95/45, 95/55, 56, 116; 96/4, 8, 10, 11, 108; 55/524, 55/DIG. 5
See application file for complete search history.

(56) References Cited

U.S. PATENT DOCUMENTS

| | | | | |
|---|---|---|---|---|
| 3,957,534 A | * | 5/1976 | Linkohr et al. ............... | 96/4 |
| 4,496,373 A | * | 1/1985 | Behr et al. .................. | 95/56 |
| 5,215,729 A | * | 6/1993 | Buxbaum ..................... | 95/56 |
| 5,238,756 A | * | 8/1993 | Fetcenko et al. ............. | 429/59 |
| 5,888,273 A | * | 3/1999 | Buxbaum ..................... | 95/56 |
| 6,443,789 B2 | * | 9/2002 | Tominetti et al. ............ | 445/53 |
| 6,461,408 B2 | * | 10/2002 | Buxbaum ..................... | 95/56 |
| 6,475,268 B2 | * | 11/2002 | Thornton ..................... | 95/56 |
| 6,478,853 B1 | * | 11/2002 | Hara et al. .................. | 95/56 |
| 6,569,226 B1 | * | 5/2003 | Dorris et al. ................ | 95/56 |

FOREIGN PATENT DOCUMENTS

JP    2000-256002    *  9/2000

* cited by examiner

*Primary Examiner*—Jason M. Greene
(74) *Attorney, Agent, or Firm*—Gifford, Krass et al.

(57) ABSTRACT

A hydrogen permeation membrane is provided having a cP2 Pearson symbol (Pm3m space group) structure. Suitable alloys include an "A" element from Periodic Table groups 3b-5b and an "M" element from the Periodic Table groups 6b-1b present at a stoichiometry that achieves the inventive crystal structure. Zr and Nb are the preferred A elements followed in preference by Ti and V. First Periodic Table row elements from groups 6b-1b are the preferred B elements. The inventive alloys also find applications as hydrogen getters, Ni-metal hydride battery materials, and hydrogen storage materials.

19 Claims, No Drawings

SPACE GROUP CP2 ALLOYS FOR THE USE AND SEPARATION OF HYDROGEN

RELATED APPLICATIONS

This application claims priority of U.S. Provisional Patent Application Ser. No. 60/526,056 filed Dec. 1, 2003, which is incorporated herein by reference.

FIELD OF THE INVENTION

The present invention relates to hydrogen absorbing membranes and materials and specifically to membranes and device components formed from intermetallic alloys having a cP2 Pearson symbol.

BACKGROUND OF THE INVENTION

The membrane of choice for extracting hydrogen from high temperature, hydrogen containing gas streams, and for purifying hydrogen to high purity is palladium silver. Typically, the palladium silver membranes are used as tubes, with a wall thickness of about 0.003 inches, a diameter between $\frac{1}{16}$th and $\frac{1}{8}$th of an inch and a composition between 23% and 25% silver by weight. Palladium silver alloys combine high selectivity, good surface properties, and reasonable mechanical properties. Specifically, palladium silver is ductile, does not embrittle in hydrogen, does not show excessive creep at operating temperatures, and brazes well to stainless steel and other materials of choice. The main problems with palladium silver are its high cost and low hydrogen flux. Practical maximum throughputs with palladium silver are on the order of 1 cubic foot/ft2.minute. These two difficulties combined result in a high cost per flux. Thinner membranes of palladium silver can be used, but it is hard to make thin tubes that are pore-free and even one pore will destroy the selectivity of the membrane.

Thin sheets of palladium copper alloys, or palladium silver alloys have been proposed as alternatives to palladium silver tubes, but currently these sheets do not provide the durability of palladium silver. Palladium copper, in particular can be rolled to a pore free thickness of about 0.001" (1 mil), and can be made thinner yet using chemical or electrochemical etching. This is about $\frac{1}{3}$rd the usable thickness of pore free palladium silver tubes, but flat plate membranes require expensive support structures that block hydrogen flow. The result is that the ratio of system cost to flux is barely less for palladium copper sheets than that for palladium silver tubes. Palladium copper is less ductile than palladium silver and as such cannot be drawn readily into tube shapes.

Palladium coated group 5b metals (V, Nb, and Ta) and alloys are also an alternative to palladium-based membranes, as detailed in U.S. Pat. No. 5,149,420; and I&EC Research 35(1996) 530. These membranes are annealed to remove the oxide film that exists between the coat and the substrate. Similar membranes have also been developed as detailed in U.S. Pat. No. 3,350,846; and U.S. Pat. No. 5,738,708. These membranes either did not include the annealing step, allow for alloys or were produced by costly ion sputtering in vacuum.

The flux with these alloys was much higher than with palladium silver or palladium copper, and the material cost is much lower. Problems associated with group 5b based membranes include embrittlement in hydrogen, and palladium substrate interdiffusion. Several alloys have been tried as substrates to eliminate these problems with group 5b based membranes. Particularly note worthy here are membranes made of vanadium nickel, vanadium nickel cobalt, and vanadium chromium titanium. These alloys embrittle far less than the group 5b metals, they start out more brittle, and as such they are not readily drawn into tubes; their physical properties are rather like palladium-copper, mentioned above. Further, the palladium substrate interdiffusion problem remains, though it seems to decrease in rough proportion to hydrogen solubility in the alloy.

Applicant has come up with a non-limiting theory for the general observation that, the less hydrogen the alloy absorbs, the slower the palladium substrate interdiffusion. This is that hydrogen in the metal stabilizes vacancies in the group 5b metals, increasing their number substantially at any temperature. Since hydrogen permeation generally requires a fairly high hydrogen solubility in the metal (permeability≈solubility×diffusivity) this explanation at first suggested that there would be no high-permeation substrate alloy that would have a low palladium-substrate diffusivity. A high palladium substrate interdiffusion rate requires that membranes must be made with fairly thick palladium coats, and this increases the cost of the membrane. Edlund has suggested that a thin coat could be used despite high interdiffusion if the substrate is coated with a ceramic interlayer, but these layers add cost and decrease the flux. Palladium, or palladium alloys must be applied to all the alloys treated so far because palladium increases the rate of hydrogen uptake and release from the membrane, greatly increasing the overall flux. Vanadium alloys containing 10% Ni or Pd (by weight) had fairly good surface properties, and came near to not needing a palladium coat. It has been suggested that palladium alloys would make better surface coatings as hydrogen is observed to create fewer defects in such alloys than in pure palladium.

The embrittlement problem with hydrogen permeation membrane materials is seen also with hydrogen storage materials. The most common hydrogen storage materials are metallic compounds like FeTi, and LaNi5. These materials are used for long-term hydrogen storage, for hydrogen removal (gettering) and as transitory hydrogen storage in hydride compressors, pumps, and nickel-metal hydride batteries. All the materials in common use are known to embrittle and to crumble with repeated cycling. This causes a variety of problems, particularly in mechanical stress to their containers, and in diminished transport of heat and hydrogen seen in the crumbled alloys.

Gschneidner et al. showed that several B2 rare earth compounds are ductile despite showing ordered CsCl structure. Gschneidner et al, Nature Materials 2(2003)587. These structures are intercalated body center cubic, also known by the cP2 Pearson symbol, or Pm3m designations. Gschneidner et al have shown that YAg was more ductile than a common aluminum alloy. The properties of these compounds as hydrogen permeation or storage materials were not established.

Thus, there exists a need for a new class of low cost allows for hydrogen permeation membranes and applications that overcomes the limitations of the prior art.

SUMMARY OF THE INVENTION

A hydrogen permeation membrane is provided having a cP2 Pearson symbol (Pm3m space group) structure. Suitable alloys include an "A" element from Periodic Table groups 3b-5b and an "M" element from the Periodic Table groups 6b-1b present at a stoichiometry that achieves the inventive crystal structure. Zr and Nb are the preferred A elements followed in preference by Ti and V. First Periodic Table row elements from groups 6b-1b are the preferred B elements. The inventive alloys also find applications as hydrogen getters, Ni-metal hydride battery materials, and hydrogen storage materials.

DESCRIPTION OF THE INVENTION

The present invention has utility as a new class of hydrogen permeation membranes. Suitable alloys include an A element from Periodic Table groups 3b-5b and an "M" element from the Periodic Table groups 6b-1b present at a stoichiometry that achieves the inventive cP2 Pearson symbol alloy. The "A" elements include the Sc, Ti, V, Y, Zr, Nb, the lanathanides, Hf, and Ta. Of the "A" elements Zr and Nb are preferred, with Ti and V being less preferred and the remaining class members being operative but suffering problems such as greater hydrogen embrittlement, difficulty in working, or higher cost. First Periodic Table row elements from groups 6b-1b are the preferred "M" elements.

Several inventive cP2 Pearson symbol structured intermetallic alloys show the high hydrogen diffusivity and solubility needed for use in membranes and getters. Preferably, the inventive cP2 Pearson symbol structured intermetallic alloys are formed into tube or foil membranes of the form AM, where A is Zr, Nb, Ti or V, and M is Cr, Mn, Fe, Co, Ni, or Cu. Preferred specific alloys membranes include ZrCo, NbCo, and VMn. It should be appreciated that the actual atomic stoichiometry of an inventive alloy AM used herein is not necessarily 1:1 to achieve a cP2 Pearson structure alloy. The binary phase diagrams for these materials are known to the art to achieve the inventive crystallographic structure. Temperatures at which an inventive membrane is effectively hydrogen permeable ranges from 200 to 800 degrees Celsius. More preferably, operating temperatures are between 300 and 500 degrees Celsius.

The inventive cP2 Pearson structure alloys also have applications as hydrogen getters, nickel-metal hydride battery materials, and hydrogen storage materials. Preferred specific alloys for these applications include those detailed above for permeation membranes with the proviso that the alloy not be VNi, FeTi, or CoTi.

Optionally, an inventive membrane is overcoated with palladium or a palladium alloy to facilitate hydrogen diffusion therethrough. To facilitate drawing of tube or rolling a foil from an inventive alloy, up to 10 atomic percent of Ni, Pd, or B is incorporated into an inventive alloy with care taken to retain the crystallographic structure of the resulting alloy. Preferably a ductility enhancing additive is present from 0.2 to 2 atomic percent.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:

1. A hydrogen permeation membrane comprising a cP2 Pearson symbol structured alloy in the form of a surface having an opposing face and having the formula AM where A is Sc, Ti, V, Y, Zr, Nb, the lanthanides, Hf, and Ta; and M is a group 6b-1b element, with the proviso that said alloy is not ZrCo or TiNi.

2. The hydrogen permeation membrane of claim 1 further comprising a palladium or palladium alloy overcoat on the surface of the membrane.

3. The hydrogen permeation membrane of claim 1 wherein the membrane is formed as a foil.

4. The hydrogen permeation membrane of claim 1 wherein the membrane is formed as a tube.

5. The membrane of claim 1 wherein A is selected from the group consisting of Zr, Nb, V, Ti.

6. The membrane of claim 5 wherein M is a first row element of 6b-1b.

7. A hydrogen permeation membrane comprising a cP2 Pearson symbol structured alloy in the form of a surface having an opposing face and having the formula AM where A is Sc, Ti, V, Y, Zr, Nb, the lanthanides, Hf, and Ta; and M is a group 6b-1b element, said cP2 Pearson symbol alloy selected from the group consisting of: NbCo, VCo, ZrCr, NbCr, VMn, VRu, and ZrNi.

8. The membrane of claim 2 wherein the palladium or palladium alloy is coated on the opposing sides of the alloy.

9. The membrane of claim 1 wherein the cP2 Pearson symbol alloy is used as a hydrogen getter, a nickel-metal hydride battery material, or a hydrogen storage material.

10. A process for hydrogen purification comprising:
exposing a gas stream comprising hydrogen to a first side of a cP2 Pearson symbol metal alloy membrane having the formula AM where A is Sc, Ti, V, Y, Zr, Nb, the lanathanides, Hf, and Ta; and M is a group 6b-1b element, with the proviso that said alloy is not ZrCo or TiNi, to a temperature sufficient to induce selective hydrogen diffusion through the membrane, and
collecting a hydrogen enriched gas from an opposing side of the membrane.

11. The process of claim 10 wherein the membrane is overcoated with palladium or a palladium alloy.

12. The process of claim 10 wherein the membrane is formed as a foil.

13. The process of claim 10 wherein the membrane is formed as a tube.

14. The process of claim 10 wherein A is selected from the group consisting of Zr, Nb, V, Ti.

15. The process of claim 14 wherein M is a first row element of 6b-1b.

16. A process for hydrogen purification comprising:
exposing a gas stream comprising hydrogen to a first side of a cP2 Pearson symbol metal alloy membrane having the formula AM where A is Sc, Ti, V, Y, Zr, Nb, the lanathanides, Hf, and Ta; and M is a group 6b-1b element, the cP2 Person symbol alloy selected from the group consisting of: NbCo, VCo, ZrCr, NbCr, VMn, VRu, and ZrNi and heated to a temperature sufficient to induce selective hydrogen diffusion through the membrane, and collecting a hydrogen enriched gas from an opposing side of the membrane.

17. The process of claim 10 wherein the palladium or palladium alloy is coated on opposing side of the alloy.

18. The membrane of claim 1, wherein said alloy is selected from the group consisting of: NbCo, VCo, ZrCr, NbCr, VMn, VRu and ZrNi.

19. The process of claim 10, wherein the alloy is selected from the group consisting of: NbCo, VCo, ZrCr, NbCr, VMn, VRu and ZrNi.

* * * * *